United States Patent
Chen et al.

(10) Patent No.: US 11,249,834 B2
(45) Date of Patent: Feb. 15, 2022

(54) STORAGE SYSTEM WITH COORDINATED RECOVERY ACROSS MULTIPLE INPUT-OUTPUT JOURNALS OF DIFFERENT TYPES

(71) Applicant: EMC IP Holding Company LLC, Hopkinton, MA (US)

(72) Inventors: Xiangping Chen, Sherborn, MA (US); Svetlana Kronrod, Concord, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 522 days.

(21) Appl. No.: 16/413,050

(22) Filed: May 15, 2019

(65) Prior Publication Data

US 2020/0364106 A1    Nov. 19, 2020

(51) Int. Cl.
*G06F 11/00* (2006.01)
*G06F 11/07* (2006.01)
*G06F 16/23* (2019.01)

(52) U.S. Cl.
CPC ...... *G06F 11/0793* (2013.01); *G06F 11/0745* (2013.01); *G06F 11/0751* (2013.01); *G06F 16/2343* (2019.01); *G06F 16/2379* (2019.01)

(58) Field of Classification Search
CPC ............. G06F 11/0793; G06F 11/0745; G06F 11/0751; G06F 11/0703; G06F 11/0709;
(Continued)

(56) References Cited

U.S. PATENT DOCUMENTS 5,581,724 A * 12/1996 Belsan ................. G06F 11/1076
    711/113
6,370,625 B1 * 4/2002 Carmean ............... G06F 9/3004
    711/150
(Continued)

FOREIGN PATENT DOCUMENTS

WO    2016111954 A1    7/2016

OTHER PUBLICATIONS

Bodorik, Peter, D. Jutla, Jacob Slonim, and A. Agarwal. "Locking with different granularities for reads and writes in an MVM system." In Proceedings. IDEAS'99. International Database Engineering and Applications Symposium (Cat. No. PR00265), pp. 311-320. IEEE, 1999. (Year: 1999).*

(Continued)

*Primary Examiner* — Anthony J Amoroso
(74) *Attorney, Agent, or Firm* — Ryan, Mason & Lewis, LLP

(57) ABSTRACT

An apparatus includes at least one processing device comprising a processor coupled to a memory, with the processing device being configured to maintain at least first and second journals for respective first and second different types of input-output requests, to move one or more entries between the first journal and the second journal under one or more specified conditions, to perform a clean-up operation for at least one of the first and second journals in conjunction with the moving of the one or more entries, and responsive to a failure occurring during the clean-up operation, to execute a contention resolution algorithm to resolve logical address range lock contentions between different entries of the first and second journals. The processing device illustratively comprises a storage controller of a storage system. The storage system may be, for example, a source storage (Continued)

system configured to carry out a synchronous replication process with a target storage system.

20 Claims, 7 Drawing Sheets

(58) Field of Classification Search
CPC ............ G06F 11/0727; G06F 11/2076; G06F 16/2379; G06F 16/2343; G06F 16/2308; G06F 16/2336; G06F 16/1805; G06F 16/1815; G06F 16/1844; G06F 16/275; G06F 2201/855
See application file for complete search history.

(56) References Cited

U.S. PATENT DOCUMENTS

| | | | |
|---|---|---|---|
| 7,444,464 B2 | 10/2008 | Urmston et al. | |
| 8,095,726 B1 | 1/2012 | O'Connell et al. | |
| 8,214,612 B1 | 7/2012 | Natanzon | |
| 9,104,326 B2 | 8/2015 | Frank et al. | |
| 9,208,162 B1 | 12/2015 | Hallak et al. | |
| 9,286,003 B1 | 3/2016 | Hallak et al. | |
| 9,552,258 B2 | 1/2017 | Hallak et al. | |
| 9,606,870 B1 | 3/2017 | Meiri et al. | |
| 9,716,754 B2 | 7/2017 | Swift | |
| 10,698,772 B2 * | 6/2020 | Hu | G06F 11/1469 |
| 10,852,999 B2 * | 12/2020 | Schneider | G06F 16/113 |
| 2008/0279462 A1 | 11/2008 | Celi, Jr. | |
| 2009/0132955 A1 | 5/2009 | Garg et al. | |
| 2010/0179941 A1 * | 7/2010 | Agrawal | G06F 11/1451 707/624 |
| 2013/0325824 A1 | 12/2013 | Shoens | |
| 2014/0181016 A1 | 6/2014 | Whitehead et al. | |
| 2016/0150012 A1 | 5/2016 | Barszczak et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2017/0192857 A1 | 7/2017 | Meiri et al. | |

OTHER PUBLICATIONS

Ballard, Lucia. "Conflict avoidance: Data structures in transactional memory." Brown University Undergraduate Thesis (2006). (Year : 2006).*

EMC Corporation, "Introduction to the EMC XtremIO Storage Array (Ver. 4.0): A Detailed Review," White Paper, Apr. 2015, 65 pages.

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "Emc Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

U.S. Appl. No. 16/037,050 filed in the name of Ying Hu et al., filed Jul. 17, 2018 and entitled "Storage System with Multiple Write Journals Supporting Synchronous Replication Failure Recovery.".

* cited by examiner

| offset | hash |
|---|---|
| X | $H_X$ |
| X+1 | $H_{X+1}$ |
| ... | ... |
| X+L-1 | $H_{X+L-1}$ |

FIG. 3A

| Jr1 | Wr | X | $H_X$ |
|---|---|---|---|
| Jr2 | Wr | X+1 | $H_{X+1}$ |
| ... | ... | ... | ... |
| JrL | Wr | X+L-1 | $H_{X+L-1}$ |

FIG. 3B

| Jr1' | Rep | X | X+L-1 |
|---|---|---|---|

FIG. 3C

JOURNAL RECOVERY CONTENTION RESOLUTION TABLE — 300

| | | |
|---|---|---|
| STARTING OFFSET 1 | LOGICAL ADDRESS RANGE VALUE | OTHER FIELDS |
| STARTING OFFSET 2 | LOGICAL ADDRESS RANGE VALUE | OTHER FIELDS |
| ... | ... | ... |
| STARTING OFFSET R | LOGICAL ADDRESS RANGE VALUE | OTHER FIELDS |

TABLE KEY

FIG. 3D

STORAGE SYSTEM WITH COORDINATED RECOVERY ACROSS MULTIPLE INPUT-OUTPUT JOURNALS OF DIFFERENT TYPES

FIELD

The field relates generally to information processing systems, and more particularly to storage in information processing systems.

BACKGROUND

Conventional storage systems are often configured to utilize multiple journals of different types in conjunction with processing of input-output (IO) requests, such as write requests and/or read requests, received from one or more host devices over a network in an information processing system. For example, journals can be used to account for requests that are currently being processed in a given storage system, also commonly referred to as "in flight" requests. The journals can be used to recover and replay these "in flight" requests if necessary. However, problems can arise in conventional storage systems when two or more related journals are subject to certain types of operations. For example, proper recovery of the multiple related journals may be prevented when failures occur in those operations. A need therefore exists for improved techniques for implementing journals in a storage system.

SUMMARY

Illustrative embodiments provide techniques for coordinated recovery across multiple journals of different types. For example, some embodiments implement a contention resolution algorithm that accurately and efficiently resolves logical address range lock contentions that might otherwise prevent journal recovery in the presence of a failure in certain types of operations, such as a failure in a clean-up operation that is performed subsequent to an entry swapping operation carried out between the multiple journals. The multiple journals illustratively include write journals or other types of IO journals having entries corresponding to respective write requests, read requests or other IO requests.

These embodiments illustratively include a clustered implementation of a content addressable storage system having a distributed storage controller. Similar advantages can be provided in other types of storage systems.

In one embodiment, an apparatus includes at least one processing device comprising a processor coupled to a memory, with the processing device being configured to maintain at least first and second journals for respective first and second different types of IO requests, to move one or more entries between the first journal and the second journal under one or more specified conditions, to perform a clean-up operation for at least one of the first and second journals in conjunction with the moving of the one or more entries, and responsive to a failure occurring during the clean-up operation, to execute a contention resolution algorithm to resolve logical address range lock contentions between different entries of the first and second journals.

The processing device illustratively comprises a storage controller of a storage system. The storage system may be, for example, a source storage system configured to carry out a synchronous replication process with a target storage system.

In some embodiments, the first journal comprises an atomic transaction write journal and the second journal comprises a synchronous replication write journal. Again, additional or alternative arrangements of multiple distinct journals can be used in other illustrative embodiments.

In some embodiments, the storage system comprises a plurality of storage nodes, with each of the storage nodes comprising a set of processing modules configured to communicate with corresponding sets of processing modules on other ones of the storage nodes. The sets of processing modules of the storage nodes of the storage system collectively comprise at least a portion of the storage controller of the storage system. Each of the sets of processing modules illustratively comprises one or more control modules, one or more routing modules and one or more data modules, and at least one of the sets of processing modules comprises a management module. Numerous other clustered and non-clustered storage system arrangements are possible in other embodiments.

In some embodiments, local copies of the first and second journals are stored on respective ones of the storage nodes. A given such local copy of the first or second journal for one of the storage nodes also represents a remote copy of that journal for one or more other ones of the storage nodes.

These and other illustrative embodiments include, without limitation, apparatus, systems, methods and processor-readable storage media.

BRIEF DESCRIPTION OF THE DRAWINGS

FIG. 3A is a table showing hash values computed for respective data pages of a multi-page write request using one possible implementation of the FIG. 2 process.

FIGS. 3B and 3C show respective examples of an atomic transaction write journal and a synchronous replication write journal for the multi-page write request of FIG. 3A.

FIG. 3D shows an example of a contention resolution table utilized in implementing coordinated recovery across multiple journals of different types in accordance with the FIG. 2 process.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
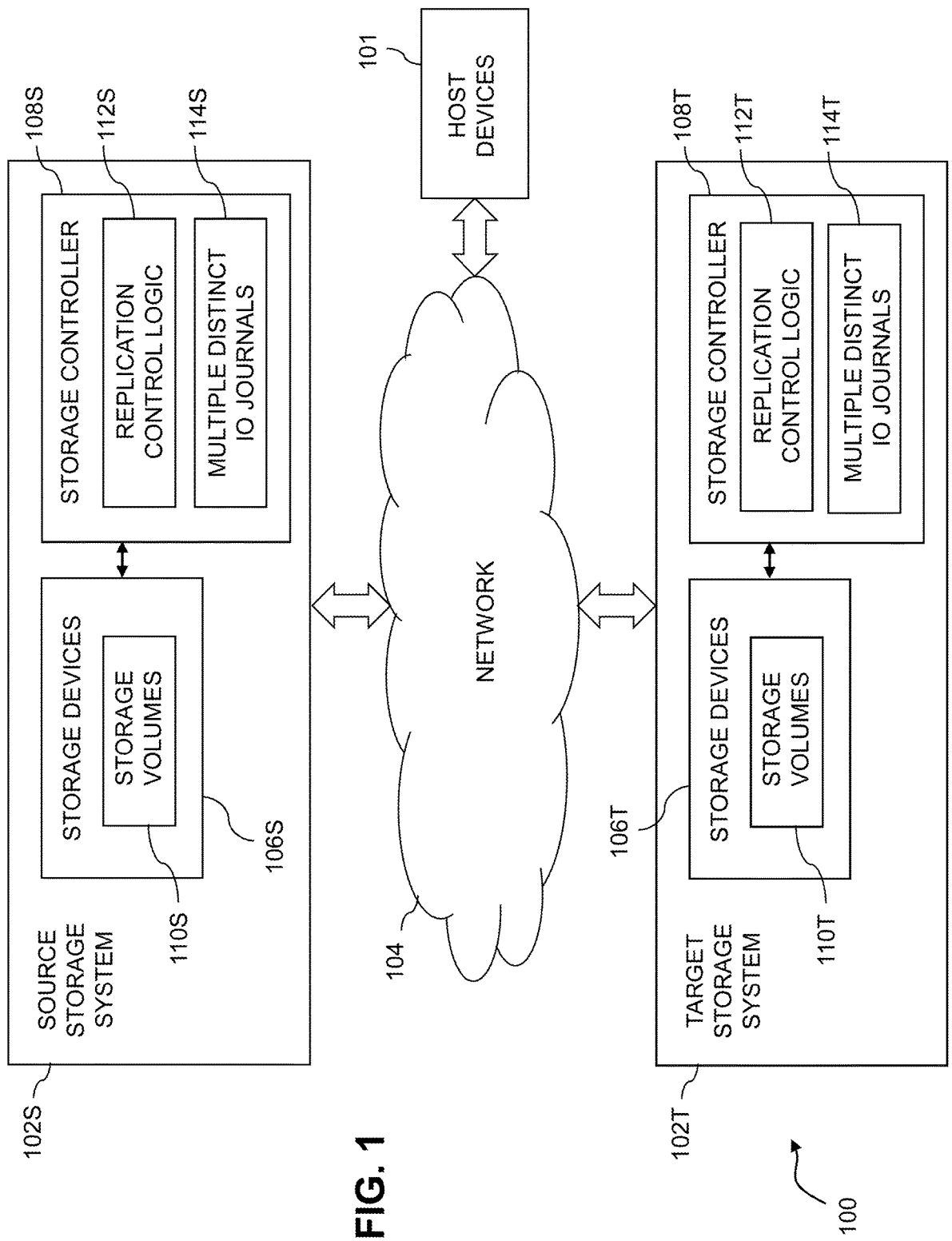
FIG. 1 is a block diagram of an information processing system comprising source and target storage systems configured with functionality for coordinated recovery across multiple journals of different types in an illustrative embodiment.

FIG. 1 shows an information processing system 100 configured in accordance with an illustrative embodiment. The information processing system 100 comprises a plurality of host devices 101, a source storage system 102S and a target storage system 102T, all of which are configured to communicate with one another over a network 104. The source and target storage systems 102 are more particularly configured in this embodiment to participate in a synchronous replication process in which one or more storage volumes are synchronously replicated from the source storage system 102S to the target storage system 102T, possibly with involvement of at least one of the host devices 101. The one or more storage volumes that are synchronously replicated from the source storage system 102S to the target storage system 102T are illustratively part of a designated consistency group.

The synchronous replication process can be initiated from another replication process of a different type, such as an asynchronous replication process. Accordingly, the storage systems 102 can transition from asynchronous to synchronous replication, and vice versa.

Each of the storage systems 102 is illustratively associated with a corresponding set of one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices. Such applications illustratively generate input-output (IO) operations that are processed by a corresponding one of the storage systems 102. The term "input-output" as used herein refers to at least one of input and output. For example, IO operations may comprise write requests and/or read requests directed to stored data of a given one of the storage systems 102. These and other types of IO operations are also generally referred to herein as IO requests.

The storage systems 102 illustratively comprise respective processing devices of one or more processing platforms. For example, the storage systems 102 can each comprise one or more processing devices each having a processor and a memory, possibly implementing virtual machines and/or containers, although numerous other configurations are possible.

The storage systems 102 can additionally or alternatively be part of cloud infrastructure such as an Amazon Web Services (AWS) system. Other examples of cloud-based systems that can be used to provide at least portions of the storage systems 102 include Google Cloud Platform (GCP) and Microsoft Azure.

The storage systems 102 may be implemented on a common processing platform, or on separate processing platforms.

The host devices 101 are illustratively configured to write data to and read data from the storage systems 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The source storage system 102S comprises a plurality of storage devices 106S and an associated storage controller 108S. The storage devices 106S store storage volumes 110S. The storage volumes 110S illustratively comprise respective logical units (LUNs) or other types of logical storage volumes.

Similarly, the target storage system 102T comprises a plurality of storage devices 106T and an associated storage controller 108T. The storage devices 106T store storage volumes 110T, at least a portion of which represent respective LUNs or other types of logical storage volumes that are replicated from the source storage system 102S to the target storage system 102T in accordance with a synchronous replication process.

The storage devices 106 of the storage systems 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, at least one of the storage systems 102 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems 102 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 102 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, communications between the host devices 101 and the storage systems 102 comprise Small Computer System Interface (SCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

The storage controller 108S of source storage system 102S in the FIG. 1 embodiment includes replication control logic 112S and multiple distinct IO journals 114S. It can also include additional elements, such as a signature generator for generating content-based signatures of respective data pages.

Similarly, the storage controller 108T of target storage system 102T includes replication control logic 112T and multiple distinct IO journals 114T. The storage controller 108T, like the storage controller 108S, can also include additional elements, such as a signature generator for generating content-based signatures of respective data pages.

The multiple distinct IO journals 114 in some embodiments comprise IO journals having different entry granularities, such as a first journal having a multi-page entry granularity and a second journal having a single-page entry granularity. The term "entry granularity" as used herein is intended to be broadly construed so as to encompass a typical entry size, entry configuration or other entry characteristic supported by the journal. For example, some journals are configured to support entries that span multiple data pages for a given multi-page IO request, while other journals are configured to support single-page entries.

As a more particular example, the first journal illustratively comprises an atomic transaction write journal having a multi-page entry granularity and the second journal illustratively comprises a synchronous replication write journal having a single-page entry granularity. Illustrations of an atomic transaction write journal and a synchronous replication write journal are shown in respective FIGS. 3B and 3C, and will be described in more detail below. It is to be appreciated that numerous other arrangements of multiple distinct IO journals can be used in other embodiments.

The term "entry" as used herein with regard to a given IO journal is also intended to be broadly construed, and may comprise, for example, a multi-page entry that comprises a head entry and one or more additional entries, with the head and additional entries illustratively corresponding to respective pages of a multi-page IO request. Entries can also correspond to respective single-page IO requests.

The instances of replication control logic 112S and 112T are collectively referred to herein as replication logic 112. Such replication control logic instances are also referred to herein as individually or collectively comprising at least a portion of a "replication engine" of the system 100.

The replication control logic 112 of the storage systems 102 controls performance of the synchronous replication process carried out between those storage systems, which as noted above in some embodiments further involves at least one of the host devices 101. The data replicated from the source storage system 102S to the target storage system 102T can include all of the data stored in the source storage system 102S, or only certain designated subsets of the data stored in the source storage system 102S, such as particular designated sets of LUNs or other logical storage volumes. Different replication processes of different types can be implemented for different parts of the stored data.

A given storage volume designated for replication from the source storage system 102S to the target storage system 102T illustratively comprises a set of one or more LUNs or other instances of the storage volumes 110S of the source storage system 102S. Each such LUN or other storage volume illustratively comprises at least a portion of a physical storage space of one or more of the storage devices 106S. The corresponding replicated LUN or other storage volume of the storage volumes 110T of the target storage system 102T illustratively comprises at least a portion of a physical storage space of one or more of the storage devices 106T.

Figure 2:
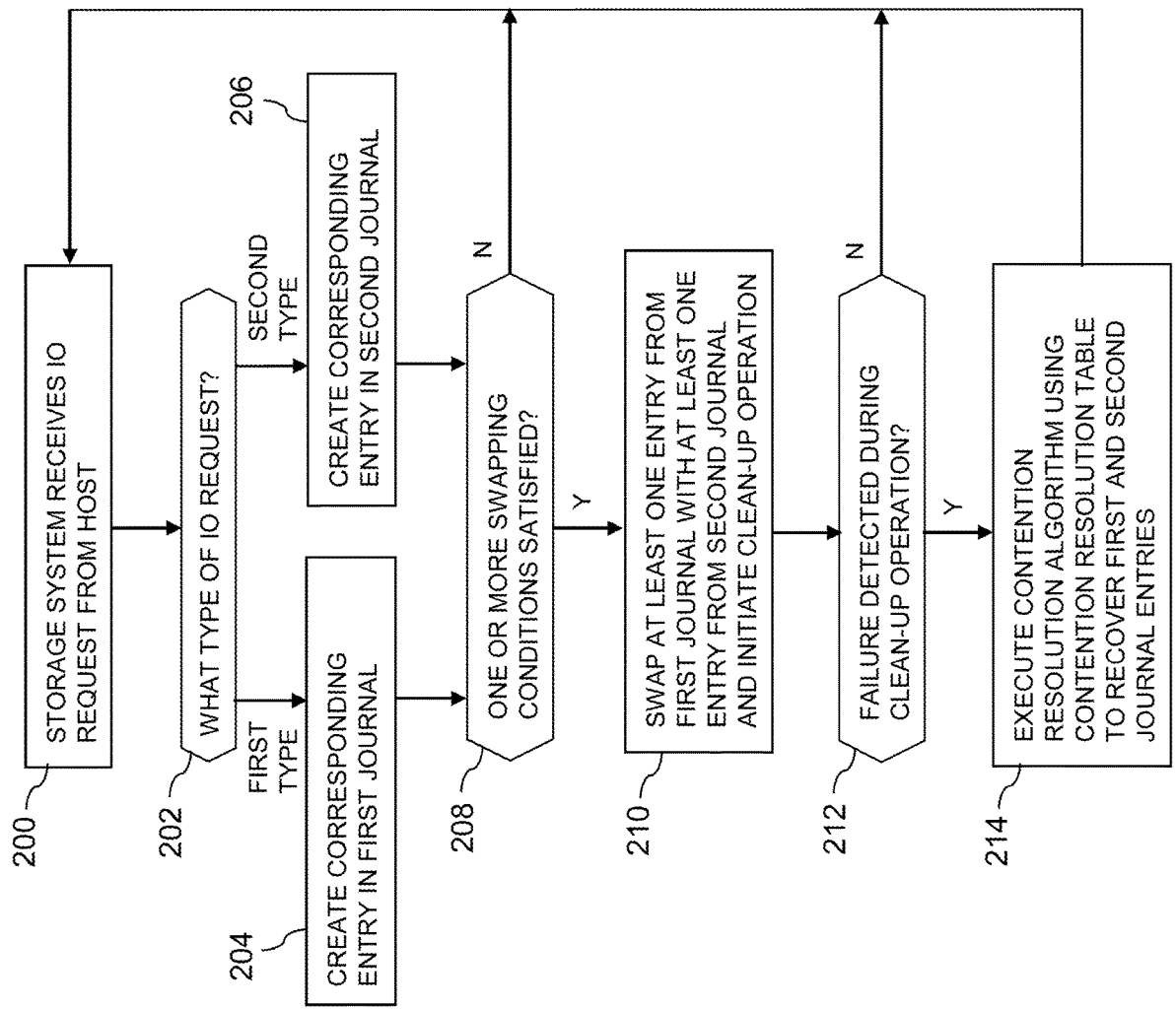
FIG. 2 is a flow diagram of a process for coordinated recovery across multiple journals of different types in an illustrative embodiment.

The replication control logic 112 of the storage systems 102 in some embodiments is configured to control the performance of a coordinated recovery process across multiple write journals, illustratively in conjunction with ongoing synchronous replication, for example, in the manner illustrated in the flow diagram of FIG. 2. At least one of the host devices 101 in some embodiments can also include one or more instances of replication control logic and possibly also one or more signature generators.

The storage controllers 108 of the storage systems 102 should also be understood to include additional modules and other components typically found in conventional implementations of storage controllers and storage systems, although such additional modules and other components are omitted from the figure for clarity and simplicity of illustration.

It will be assumed for the following description of the FIG. 1 embodiment that there is an ongoing synchronous replication process being carried out between the source storage system 102S and the target storage system 102T in the system 100, utilizing their respective instances of replication control logic 112S and 112T.

An exemplary synchronous replication process more particularly comprises a synchronous replication process in which host writes to a consistency group comprising one or more storage volumes are mirrored from the source storage system 102S to the target storage system 102T as the host writes are made at the source storage system 102S.

Other types of replication arrangements can be used in other embodiments. For example, the storage systems may be configurable to operate in both asynchronous and synchronous replication modes, with transitions between the modes controlled by their respective instances of replication control logic 112S and 112T.

A given such asynchronous replication mode illustratively comprises a cycle-based asynchronous replication process in which a consistency group comprising one or more storage volumes is replicated from the source storage system 102S to the target storage system 102T over a plurality of asynchronous replication cycles.

Other examples of replication processes that can be used in illustrative embodiments include active-active replication, in which one of the storage systems operates as a "leader" relative to another one of the storage systems operating as a "follower" in implementing consistent synchronous writes to both storage systems. Such active-active replication is considered a type of synchronous replication as that term is broadly used herein.

The system 100 is illustratively configured to provide what is referred to herein as "coordinated recovery across multiple journals." For example, such coordinated recovery in some embodiments is from a failure that occurs in a write journal clean-up operation performed as part of synchronous replication carried out between the source storage system 102S and the target storage system 102T. These and other operations related to coordinated recovery across multiple journals as disclosed herein are illustratively implemented at least in part by or otherwise under the control of the source and target instances of replication control logic 112S and 112T. One or more such operations can be additionally or alternatively controlled by one or more other system components in other embodiments.

In accordance with the functionality for coordinated recovery across multiple journals, at least one of the storage systems 102 is configured to maintain at least first and second journals for respective first and second different types of IO requests, to move one or more entries between the first journal and the second journal under one or more specified conditions, to perform a clean-up operation for at least one of the first and second journals in conjunction with the moving of the one or more entries, and responsive to a failure occurring during the clean-up operation, to execute a contention resolution algorithm to resolve logical address range lock contentions between different entries of the first and second journals.

The term "clean-up operation" as used herein is intended to be broadly construed, so as to encompass, for example, various arrangements for deleting or otherwise removing entries that are no longer needed in at least one journal, as well as other techniques for freeing up and/or reclaiming entry space in at least one journal so as to make that space available for use by one or more new entries. Such an operation performed "in conjunction with" the moving of one or more entries can be performed, for example, immediately after the moving, or possibly at least in part during some aspect of the moving. The term "in conjunction with" as used herein is therefore also intended to be broadly construed.

The first and second journals are illustratively part of at least one of the sets of multiple distinct journals 114. For example, as indicated elsewhere herein, the first journal illustratively comprises an atomic transaction write journal and the second journal illustratively comprises a synchronous replication write journal, possibly arranged in the manner shown in respective FIGS. 3B and 3C.

Such journals may also be viewed as examples of journals having different entry granularities. More particularly, the first journal illustratively has a multi-page entry granularity and the second journal illustratively has a single-page entry granularity, with entries of the first journal corresponding to respective multi-page requests and entries of the second journal correspond to respective single-page requests. In the case of a multi-page request, the entry illustratively comprises a head entry and one or more additional entries, with the head and additional entries illustratively corresponding to respective pages of a multi-page IO request. Again, other types of write journals having different types and arrangements of entries can be used in other embodiments.

In some embodiments, maintaining at least first and second journals for respective first and second different types of IO requests comprises receiving IO requests from at least one of the host devices 101. Responsive to a given one of the received IO requests being a multi-page request, a corresponding entry is created in the first journal, and responsive to a given one of the received IO requests being a single-page request, a corresponding entry is created in the second journal. The first journal is configured to ensure that the multi-page request is completed for all of its multiple pages or for none of the multiple pages. The corresponding entry created in the first journal for a multi-page request illustratively comprises a head entry and one or more additional entry, each corresponding to a different data page of the multi-page request.

It is to be appreciated in this regard that references herein to creation of an entry for a given received IO request in one of the first and second journals should not be construed as necessarily implying that no entry is created for that received IO request in the other one of the first and second journals.

In some embodiments, moving one or more entries between the first journal and the second journal under one or more specified conditions illustratively comprises swapping at least one entry from the first journal with at least one entry from the second journal. For example, a head entry of the atomic transaction write journal of FIG. 3B can be swapped with an entry of the synchronous replication write journal of FIG. 3C. Numerous other types of entry swapping can be performed in other embodiments.

As noted above, illustrative embodiments execute a contention resolution algorithm to resolve logical address range lock contentions between different entries of the first and second journals, responsive to a failure occurring during a clean-up operation, in order to facilitate recovery of the first and second journals. The term "contention resolution algorithm" as used herein is intended to be broadly construed so as to encompass algorithms that include various operations associated with journal recovery, as well as operations associated with resolution of logical address range lock contentions.

In some embodiments, an example contention resolution algorithm more particularly includes the following steps:

1. Apply logical address range locks for entries of the first journal.

2. Make one or more attempts to apply logical address range locks for entries of the second journal.

3. For each of the one or more attempts in Step 2 that are unsuccessful due to logical address range lock contention with the first journal:
   (a) determine a lock contention range for a corresponding entry of the second journal by repeating the attempt one or more times utilizing a minimum locking granularity or other reduced locking granularity; and
   (b) enter the lock contention range in a contention resolution table. An example of the contention resolution table is shown in FIG. 3D. As will be described in more detail elsewhere herein, recovery operations are performed for the first and second journals based at least in part on entries of the contention resolution table.

4. Perform recovery operations for a particular subset of the entries of the first journal.

5. For each of one or more remaining entries of the first journal:
   (a) determine if that entry of the first journal corresponds to one of the lock contention ranges of the contention resolution table;
   (b) responsive to the entry corresponding to one of the lock contention ranges of the contention resolution table, skip an unlock operation for a logical address range lock for that entry; and
   (c) responsive to the entry not corresponding to any of the lock contention ranges of the contention resolution table, perform an unlock operation for a logical address range lock for that entry.

6. Perform recovery operations for entries of the second journal.

7. Responsive to completion of all recovery operations for entries of the second journal, perform unlock operations for any remaining logical address range locks for the second journal.

8. Complete any remaining recovery operations for entries of the first journal.

9. Clear the contention resolution table.

Additional or alternative steps may be used in the contention resolution algorithm in other embodiments. Also, the ordering of the steps can be varied, and two or more of the steps can be performed at least in part in parallel with each other.

The remaining entries referred to in Step 5 above illustratively include entries of the first journal that do not have corresponding head entries in the first journal. Such remaining entries are also referred to herein as "leftover entries" that are subject to a clean-up operation subsequent to swapping of entries between the first and second journals.

In some embodiments, at least one of the storage systems 102 comprises a plurality of storage nodes each comprising a set of processing modules configured to communicate with corresponding sets of processing modules on other ones of the storage nodes. The sets of processing modules of the storage nodes of the source storage system collectively comprise at least a portion of the storage controller of the storage system.

Such arrangements can be further configured to store local copies of the first and second journals on respective ones of the storage nodes. A given such local copy of the first or second journal for one of the storage nodes also represents a remote copy of that journal for one or more other ones of the storage nodes.

As mentioned previously, the storage systems 102 in some embodiments comprise respective content addressable storage systems in which logical addresses of data pages are mapped to physical addresses of the data pages using respective content-based signatures that are generated from those data pages.

The content-based signatures utilized in some embodiments illustratively comprise respective hash digests of respective data pages of a storage volume. A given one of the hash digests is generated in illustrative embodiments by applying a secure hashing algorithm to content of a corresponding one of the data pages of the storage volume. For example, a given hash digest can be generated by application of a hash function such as the well-known Secure Hashing Algorithm 1 (SHA1) to the content of its corresponding data page. Other types of secure hashing algorithms, such as SHA2 or SHA256, or more generally other hash functions, can be used in generating content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

In some embodiments, various types of address metadata are utilized to provide content addressable storage functionality. The address metadata in some embodiments comprises at least a portion of one or more logical layer mapping tables that map logical addresses of respective ones of the data pages of a storage volume to corresponding content-based signatures of the respective data pages. Examples of logical layer mapping tables and other metadata structures maintained by at least the storage controller 108T of target storage system 102T will be described elsewhere herein.

As indicated previously, the replication control logic instances 112S and 112T are assumed to cooperate to implement a synchronous replication process, and in some embodiments collectively provide a replication engine of system 100 that can replicate one or more storage volumes from one of the storage systems 102 to the other one of the storage systems, and vice-versa. Accordingly, the designation of one of the storage systems 102 as the "source" and the other as the "target" can vary over time.

The replicated storage volume illustratively comprises at least one logical storage volume that is part of a consistency group subject to the ongoing replication process carried out between the source and target storage systems 102.

The term "storage volume" as used herein is intended to be broadly construed, and should not be viewed as being limited to any particular format or configuration. The term "consistency group" as used herein is also intended to be broadly construed, and may comprise one or more other storage volumes.

The above-described operations carried out in conjunction with a process for coordinated recovery across multiple journals involving the storage systems 102 are illustratively performed at least in part under the control of the replication engine comprising the multiple instances of replication control logic 112.

The storage systems 102 in the FIG. 1 embodiment are assumed to be implemented using at least one processing platform each comprising one or more processing devices each having a processor coupled to a memory. Such processing devices can illustratively include particular arrangements of compute, storage and network resources.

The storage systems 102 may be implemented on respective distinct processing platforms, although numerous other arrangements are possible. At least portions of their associated host devices may be implemented on the same processing platforms as the storage systems 102 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage systems 102 to reside in different data centers. Numerous other distributed implementations of the storage systems 102 and their respective associated sets of host devices are possible.

Additional examples of processing platforms utilized to implement storage systems and possibly their associated host devices in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, storage systems 102, network 104, storage devices 106, storage controllers 108 and storage volumes 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for coordinated recovery across multiple journals can be implemented in one or more host devices, or partially in a host device and partially in a storage system. Accordingly, illustrative embodiments are not limited to arrangements in which all such functionality is implemented in source and target storage systems or a host device, and therefore encompass various hybrid arrangements in which the functionality is distributed over one or more storage systems and one or more associated host devices, each comprising one or more processing devices.

As another example, it is possible in some embodiments that the source storage system and the target storage system can comprise the same storage system. In such an arrangement, a replication process is illustratively implemented to replicate data from one portion of the storage system to another portion of the storage system. The terms "source storage system" and "target storage system" as used herein are therefore intended to be broadly construed so as to encompass such possibilities.

The operation of the information processing system 100 will now be described in further detail with reference to the flow diagram of the illustrative embodiment of FIG. 2, which implements a process for coordinated recovery across multiple journals, possibly in conjunction with ongoing synchronous replication.

The coordinated recovery process as illustrated in FIG. 2 includes steps 200 through 214, and is suitable for use in system 100 but is more generally applicable to a wide variety of other types of information processing systems comprising at least one storage system having multiple distinct IO journals.

In step 200, a storage system receives an IO request from a host device.

In step 202, a determination is made regarding the particular type of IO request that was received. It is assumed in this embodiment that there are two different journals utilized for respective first and second different types of IO requests. The received IO request in this embodiment is therefore either of the first type or the second type. If the received IO request is of the first type, the process moves to step 204, and if the received IO request is of the second type, the process moves to step 206.

In step 204, a corresponding entry is created in the first journal.

In step 206, a corresponding entry is created in the second journal.

The particular configuration of steps 204 and 206, like that of other steps of the FIG. 2 process, can be varied in other embodiments. For example, in conjunction with creation of a given multi-page entry in the first journal, assuming that the first journal in the present embodiment is configured to support multi-page entries but the second journal is not so configured, a corresponding entry may nonetheless be made in the second journal, with that corresponding entry being of a type supported by the second journal. Numerous other entry generation arrangements are possible. Accordingly, references to generation of an entry in one of the first and second journals should not be viewed as precluding generation of an entry in the other one of the first and second journals.

It should also be noted that steps 200 through 206, and possibly one or more other steps of the FIG. 2 process, could be iterated for respective ones of multiple IO requests.

In step 208, a decision is made as to whether or not one or more swapping conditions are satisfied. If the one or more swapping conditions are satisfied, the process moves to step 210 as indicated, and otherwise returns to step 200 to receive additional IO requests from the host device for which entries are created in the first or second journals in steps 204 and 206 depending upon the request type.

In step 210, at least one entry from the first journal is swapped with at least one entry from the second journal, and a clean-up operation is initiated. The process then moves to step 212 as indicated.

In step 212, a determination is made as to whether or not a failure has been detected during the clean-up operation. If a failure has been detected, the process moves to step 214 as indicated, and otherwise returns to step 200.

In step 214, a contention resolution algorithm is executed using a contention resolution table to recover entries of the first and second journals.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for coordinated recovery of multiple journals. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different coordinated recovery processes for respective different sets of multiple journals or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, storage controllers such as storage controllers 108 of storage systems 102 that are configured to control performance of one or more steps of the FIG. 2 process in their corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controllers 108, as well as other system components, may be implemented at least in part using processing devices of such processing platforms. For example, in a distributed implementation of a given one of the storage controllers 108, respective distributed modules of such a storage controller can be implemented in respective containers running on respective ones of the processing devices of a processing platform.

Additional details regarding one possible implementation of the FIG. 2 process will now be described with reference to FIGS. 3A through 3D. Before describing those figures, example metadata structures will be presented.

The example metadata structures are assumed to be maintained within the source and target storage systems, and include the logical layer and physical layer mapping tables described below. It is to be appreciated that these particular tables are only examples, and other tables or metadata structures having different configurations of entries and fields can be used in other embodiments. The logical layer and physical layer mapping tables in this embodiment illustratively include the following:

1. An address-to-hash ("A2H") table. The A2H table comprises a plurality of entries accessible utilizing logical addresses as respective keys, with each such entry of the A2H table comprising a corresponding one of the logical addresses, a corresponding one of the hash handles, and possibly one or more additional fields.

2. A hash-to-data ("H2D") table that illustratively comprises a plurality of entries accessible utilizing hash handles as respective keys, with each such entry of the H2D table comprising a corresponding one of the hash handles, a physical offset of a corresponding one of the data pages, and possibly one or more additional fields.

3. A hash metadata ("HMD") table illustratively comprising a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The MD table illustratively comprises at least a portion of the same information that is found in the H2D table.

Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based ("PLB") table that illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Again, the logical layer and physical layer mapping tables referred to above are examples only, and can be varied in other embodiments.

The example implementation of the FIG. 2 process will now be described in further detail. More particularly, steps 200 through 210 of this particular example implementation of the FIG. 2 process for a given received multi-page request illustratively include the following steps:

1. Receive multi-page request "write volume 1, offset X, length L."

2. Calculate hash for each data page of multi-page request and store data pages in persistent storage.

3. Create A2H journal entry for each data page.

4. Update A2H table in persistent storage.

5. Swap journal entries between A2H journal and synchronous replication write journal.

Step 1 above shows the format of the received multi-page write request. It includes an offset of an initial page, plus a length that denotes the full range of data pages to be written in accordance with the request. A wide variety of other IO request formats can be used in other embodiments.

Referring initially to FIG. 3A, a table is shown that includes hash values computed for respective data pages of the multi-page write request in Step 2. In this embodiment, it is assumed that the multi-page write request is directed to multiple data pages at respective logical address offsets denoted X, X+1, . . . X+L−1. Content-based signatures are computed from the content of these respective data pages as respective hashes $H_X, H_{X+1}, \ldots H_{X+L-1}$. The content-based signatures in this embodiment are more particularly assumed to comprise respective hash handles, although other types of content-based signatures can be used.

FIG. 3B shows a portion of the A2H journal for the multi-page request of FIG. 3A. The A2H journal is an example of what is more generally referred to herein as an atomic transaction write journal or still more generally as a first journal, and is assumed to be configured to store entries for multi-page requests, using a head entry and one or more additional entries for respective ones of the multiple pages.

In this embodiment, the A2H journal more particularly includes separate entries denoted Jr1, Jr2, . . . JrL for respective single-page writes ("Wr") to respective data pages having logical address offsets X, X+1, . . . X+L−1 and hashes $H_X, H_{X+1}, \ldots H_{X+L-1}$. The entry Jr1 is an example of what is referred to herein as a "head entry" for a first data page of the multi-page request, while the other entries shown are additional entries for respective additional pages of the multi-page request. The multiple single-page entries in the A2H journal collectively form a multi-page entry of that journal.

FIG. 3C shows a portion of the synchronous replication write journal for the multi-page request of FIG. 3A. The synchronous replication write journal is an example of what is more generally referred to herein as a second journal, and is assumed to not be configured to store entries for multi-page requests. The synchronous replication write journal in this embodiment comprises only a single entry for the multi-page request. This entry is more particularly shown in FIG. 3C as an entry denoted Jr1' for a replication ("Rep") of data pages in the range of logical addresses from X to X+L−1.

In Step 3 of the example process outlined above, the multiple single-page entries in the A2H journal are created, with each such entry storing the corresponding offset and hash handle of the data page.

Step 5 above illustratively swaps the first A2H journal entry Jr1 with the synchronous replication journal entry Jr1'. Since the hash handles have already been persisted as part of the A2H table in Step 4, only the offset and length of the multi-page request are reflected in the synchronous replication write journal.

At the completion of Step 5, the additional entries of the A2H journal, also referred to herein as "leftover entries," can be cleaned up using a clean-up operation of the type referred to elsewhere herein. If such a clean-up operation were to fail prior to its completion, the leftover entries of the A2H journal could overlap or otherwise collide with entries of the synchronous replication write journal, possibly leading to a journal recovery failure. More particularly, in some embodiments, the storage system first locks the logical address ranges needed for recovery of the multiple journals, and then starts servicing IO requests and performing journal recovery concurrently. If there are overlapped or otherwise colliding entries in journals of different types, it could cause locking contention between those entries during the recovery process, leading to recovery failure. The use of a contention resolution algorithm of the type described herein to implement coordinated recovery across multiple journals advantageously avoids such potentially problematic issues.

It should be noted that some embodiments are configured to perform entry swapping and associated clean-up operations even in the case of a single-page request. However, in the case of the single-page request there will be no additional entries of the types described above for the multi-page request.

In some embodiments, a clean-up operation is initiated each time there is a swap of entries between journals, although other arrangements are possible. For example, other embodiments can be configured to periodically clean up after multiple accumulated swaps.

In some embodiments, multiple entries from one journal are swapped with a single entry from the second journal. Again, other arrangements are possible, including swapping multiple entries of one journal with multiple entries of another journal. Terms such as "swap" and "swapping" as used herein are therefore intended to be broadly construed. Moreover, it is possible in some embodiments for an entry to be modified in conjunction with a swapping operation. For example, an entry can be modified from a first format utilized by one of the journals to a different format used by another one of the journals. Any such modification, if present, is assumed to be part of the swapping operation herein.

For a given many-to-one journal entry swap, the first entry of the many entries is also referred to herein as a "head entry." Journal entries without corresponding head entries are referred to herein as "leftover entries" and are subject to clean-up operations as described herein.

Referring now to FIG. 3D, an example of a contention resolution table 300 utilized to facilitate journal recovery in the contention resolution algorithm of step 214 of the FIG. 2 process is shown. The contention resolution table 300 in this embodiment comprises a plurality of entries accessible utilizing starting offsets, denoted Starting Offset 1, Starting Offset 2, . . . Starting Offset R, as respective keys, with each such entry of the contention resolution table comprising a logical address range value, and possibly one or more additional fields. The length L in the example process given above is considered a type of "logical address range value" as that latter term is broadly used herein.

The contention resolution table 300 is used as part of the contention resolution algorithm to resolve logical address range lock contentions between multiple journals of different types. The contention resolution table 300 in some embodiments is populated only as needed for journal recovery, in accordance with the contention resolution algorithm, and is cleared once the journal recovery is complete.

The contention resolution table 300 in some embodiments is implemented in a control module of a distributed storage controller, such as in one or more of the control modules to be described below in conjunction with the embodiment of FIG. 4, although numerous other arrangements are possible. In some arrangements of this type, the control modules are configured to perform logical address to hash mapping using A2H tables, with IO request handling in the various control modules being synchronized through the use of logical address range locks. During recovery, all of the logical address range locks needed for journal recovery are applied first, and then IO request handling and journal recovery are performed concurrently to minimize the impact of recovery. The techniques disclosed herein allow resolution of potential logical address conflicts in a particularly efficient manner that considerably facilitates the recovery of multiple journals of different types.

Although some of the examples above utilize write operations, the disclosed techniques are more generally applicable to other types of IO requests that may require two or more different types of journal protection at different phases.

Again, it is to be appreciated that terms such as "table" and "entry" as used herein are intended to be broadly construed, and the particular example table and entry arrangements of FIGS. 3A through 3D can be varied in other embodiments. For example, additional or alternative arrangements of entries can be used.

In some embodiments, the storage system comprises an XtremIO™ storage array or other type of content addressable storage system suitably modified to incorporate functionality for coordinated recovery across multiple journals as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of a given one of the storage systems 102, and accordingly is assumed to be coupled to the other one of the storage systems 102 and to one or more host devices of a computer system within information processing system 100.

Although it is assumed that both the source storage system 102S and the target storage system 102T are content addressable storage systems in some embodiments, other types of storage systems can be used for one or both of the source storage system 102S and the target storage system 102T in other embodiments. For example, it is possible that at least one of the storage systems 102 in an illustrative embodiment need not be a content addressable storage system and need not include an ability to generate content-based signatures. In such an embodiment, the signature generator and other parts of the functionality for coordinated recovery across multiple journals of the one or more storage systems can be implemented in a host device.

The storage controller 408 in the present embodiment is configured to implement functionality for coordinated recovery across multiple journals of the type previously described in conjunction with FIGS. 1 through 3. For example, the content addressable storage system 405 illustratively participates as a source storage system in a synchronous replication process with a target storage system that may be implemented as another instance of the content addressable storage system 405.

The storage controller 408 includes distributed modules 412 and 414, which are configured to operate in a manner similar to that described above for respective corresponding replication control logic 112 and multiple distinct IO journals 114 of the storage controllers 108 of system 100. Module 412 is more particularly referred to as distributed replication control logic, and illustratively comprises multiple replication control logic instances on respective ones of a plurality of distinct nodes, with the multiple replication control logic instances comprising at least a portion of a replication engine configured to perform process operations associated with synchronous replication. Module 414 more particularly comprises distributed IO journals and associated contention resolution tables with different instances thereof being implemented on respective ones of the distinct nodes.

Figure 4:
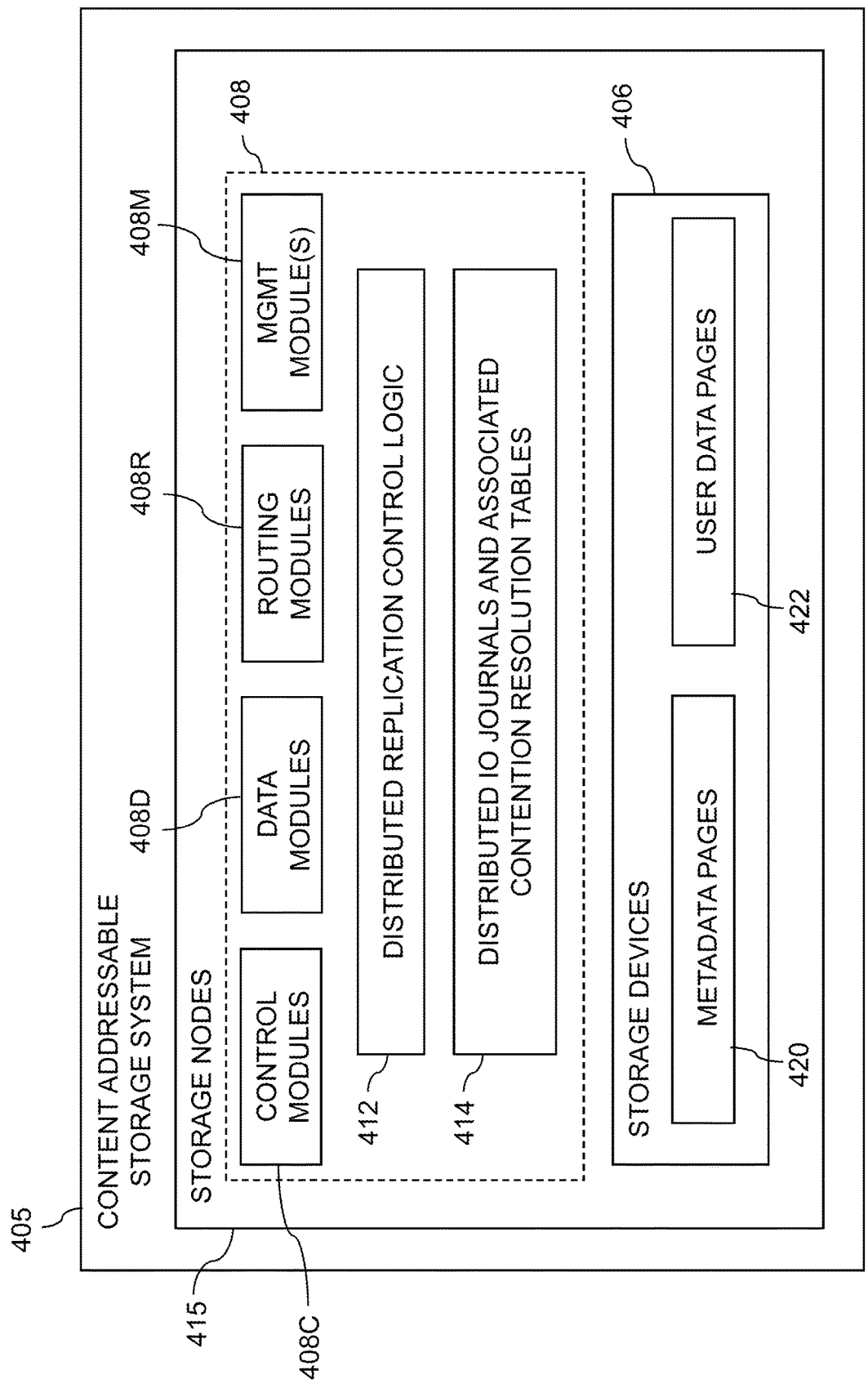
FIG. 4 illustrates a portion of a distributed storage controller of a content addressable storage system showing one possible arrangement implementing coordinated recovery across multiple journals of different types.

The content addressable storage system 405 in the FIG. 4 embodiment is implemented as at least a portion of a clustered storage system and includes a plurality of storage nodes 415 each comprising a corresponding subset of the storage devices 406. Such storage nodes 415 are examples of the "distinct nodes" referred to above, and other clustered storage system arrangements comprising multiple storage nodes and possibly additional or alternative nodes can be used in other embodiments. A given clustered storage system may therefore include not only storage nodes 415 but also additional storage nodes, compute nodes or other types of nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 is referred to as distributed storage controller 408.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415. A given set of processing modules implemented on a particular one of the storage nodes 415 therefore illustratively includes at least one control module 408C, at least one data module 408D and at least one routing module 408R, and possibly a management module 408M.

Communication links may be established between the various processing modules of the distributed storage controller 408 using well-known communication protocols such as IP, Transmission Control Protocol (TCP), and remote direct memory access (RDMA). For example, respective sets of IP links used in data transfer and corresponding messaging could be associated with respective different ones of the routing modules 408R.

Although shown as separate modules of the distributed storage controller 408, the modules 412 and 414 in the present embodiment are assumed to be distributed at least in part over at least a subset of the other modules 408C, 408D, 408R and 408M of the storage controller 408. Accordingly, at least portions of the functionality for coordinated recovery across multiple journals of the modules 412 and 414 may be implemented in one or more of the other modules of the storage controller 408. In other embodiments, the modules 412 and 414 may be implemented as stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users of the content addressable storage system 405. Each such LUN may comprise particular ones of the above-noted pages of the user data area. The user data stored in the user data pages 422 can include any type of user data that may be utilized in the system 100. The term "user data" herein is therefore also intended to be broadly construed.

A given storage volume for which content-based signatures are generated using modules 412 and 414 illustratively comprises a set of one or more LUNs, each including multiple ones of the user data pages 422 stored in storage devices 406.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, in a given set of n user data pages representing a portion of the user data pages 422, each of the user data pages is characterized by a LUN identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages having respective signatures. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The functionality for coordinated recovery across multiple journals provided by modules 412 and 414 in this embodiment is assumed to be distributed across multiple distributed processing modules, including at least a subset of the processing modules 408C, 408D, 408R and 408M of the distributed storage controller 408.

For example, the management module 408M of the storage controller 408 may include a replication control logic instance that engages corresponding replication control logic instances in all of the control modules 408C and routing modules 408R in order to implement a synchronous replication process.

In some embodiments, the content addressable storage system 405 comprises an XtremIO™ storage array suitably modified to incorporate functionality for coordinated recovery across multiple journals as disclosed herein.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, functionality for coordinated recovery across multiple journals in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary.

The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device over a network. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 405. The HMD table or a given portion thereof in some embodiments disclosed herein is more particularly referred to as a hash-to-data ("H2D") table.

The first level of mapping using the A2H table associates logical addresses of respective data pages with respective content-based signatures of those data pages. This is also referred to as logical layer mapping.

The second level of mapping using the MD table associates respective ones of the content-based signatures with respective physical storage locations in one or more of the storage devices 106. This is also referred to as physical layer mapping.

Examples of these and other metadata structures utilized in illustrative embodiments were described elsewhere herein. These particular examples illustratively include respective A2H, H2D, HMD and PLB tables. In some embodiments, the A2H and H2D tables are utilized primarily by the control modules 408C, while the HMD and PLB tables are utilized primarily by the data modules 408D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the content addressable storage system 405. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement functionality for coordinated recovery across multiple journals in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of a storage system with functionality for coordinated recovery across multiple journals as disclosed herein can provide a number of significant advantages relative to conventional arrangements.

For example, some of these embodiments advantageously provide increased efficiency in recovery from failures in clean-up operations performed in conjunction with swapping of entries between journals.

Advantages are provided in illustrative embodiments through the use of a contention resolution algorithm that accurately and efficiently resolves logical address range lock contentions that might otherwise prevent journal recovery in the presence of a failure in certain types of operations.

Such arrangements are applicable to a wide variety of different types of journals and associated IO operations for which journal entries are generated. For example, although some embodiments herein refer to write requests and write journals, this is for purposes of illustration only, and not limiting in any way.

Also, although illustrative embodiments are described in the context of replication, the disclosed techniques are not limited to use in the replication context. Instead, advantages are achieved in numerous other contexts involving multiple journals.

Functionality for coordinated recovery across multiple journals as disclosed herein can be implemented in at least one storage system, in at least one host device, or partially in one or more storage systems and partially in one or more host devices.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for coordinated recovery across multiple journals will now be described in greater detail with reference to FIGS. 5 and 6. Although described in the context of system 100, these platforms may also be used to implement at least portions of other information processing systems in other embodiments.

Figure 5:
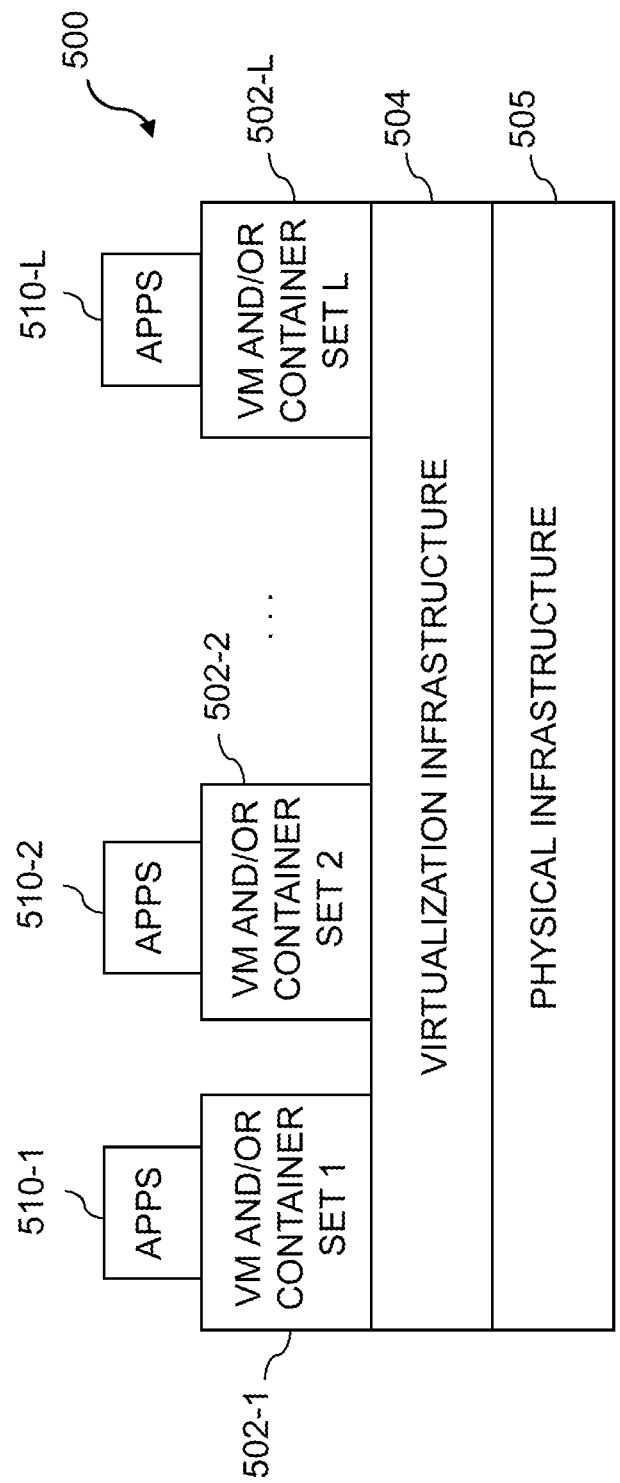
FIGS. 5 and 6 show examples of processing platforms that may be utilized to implement at least a portion of an information processing system in illustrative embodiments.
Figure 6:
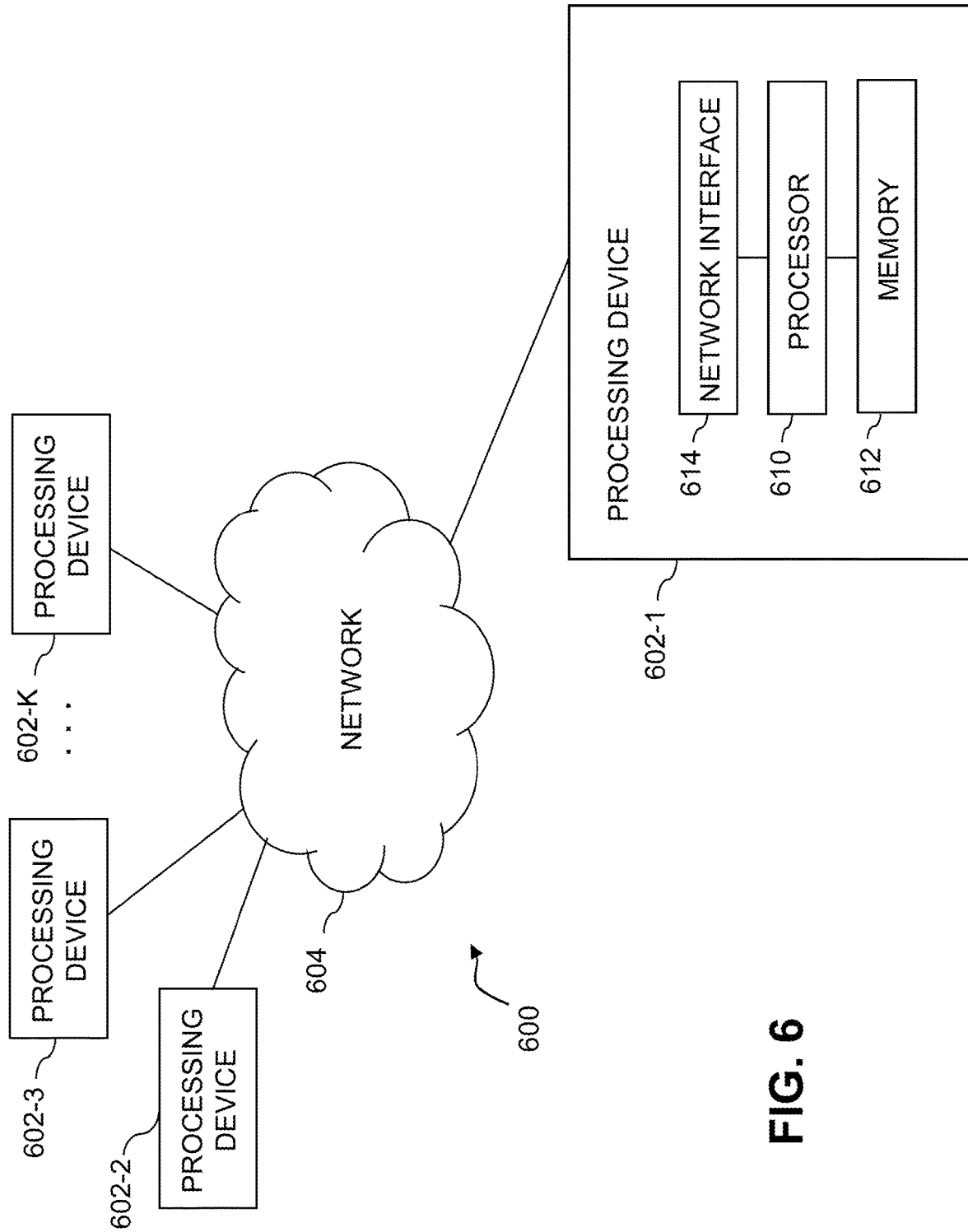

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide functionality for coordinated recovery across multiple journals of the type described above for one or more processes running on a given one of the VMs. For example, each of the VMs can implement replication control logic instances and/or other components for supporting functionality for coordinated recovery across multiple journals in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide functionality for coordinated recovery across multiple journals of the type described above. For example, a container host device supporting multiple containers of one or more container sets can implement one or more instances of replication control logic and/or other components for supporting functionality for coordinated recovery across multiple journals in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for coordinated recovery across multiple journals of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, multiple IO journals, replication control logic and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
said at least one processing device being configured:
to maintain at least first and second journals for respective first and second different types of input-output requests;
to move one or more entries between the first journal and the second journal under one or more specified conditions;
to perform a clean-up operation for at least one of the first and second journals in conjunction with the moving of the one or more entries; and
responsive to a failure occurring during the clean-up operation, to execute a contention resolution algorithm to resolve logical address range lock contentions between different entries of the first and second journals.

2. The apparatus of claim 1 wherein said at least one processing device comprises a storage controller of a storage system.

3. The apparatus of claim 1 wherein the first journal comprises an atomic transaction write journal and the second journal comprises a synchronous replication write journal.

4. The apparatus of claim 1 wherein the first and second journals have different entry granularities.

5. The apparatus of claim 4 wherein the first journal has a multi-page entry granularity and the second journal has a single-page entry granularity.

6. The apparatus of claim 1 wherein entries of the first journal correspond to respective multi-page requests and entries of the second journal correspond to respective single-page requests.

7. The apparatus of claim 1 wherein maintaining at least first and second journals for respective first and second different types of input-output requests comprises:
 receiving input-output requests from at least one host device; and
 for each of the received input-output requests:
 responsive to the input-output request being a multi-page request, creating a corresponding entry in the first journal;
 responsive to the input-output request being a single-page request, creating a corresponding entry in the second journal; and
 wherein the first journal is utilized to ensure that the multi-page request is completed for all of its multiple pages or for none of the multiple pages.

8. The apparatus of claim 1 wherein moving one or more entries between the first journal and the second journal under one or more specified conditions comprises swapping at least one entry from the first journal with at least one entry from the second journal.

9. The apparatus of claim 1 wherein executing a contention resolution algorithm to resolve logical address range lock contentions between different entries of the first and second journals comprises:
 applying logical address range locks for entries of the first journal;
 making attempts to apply logical address range locks for entries of the second journal; and
 for each of one or more of the attempts that are unsuccessful due to logical address range lock contention with the first journal:
 determining a lock contention range for a corresponding entry of the second journal by repeating the attempt one or more times utilizing a reduced locking granularity; and
 entering the lock contention range in a contention resolution table;
 wherein recovery operations are performed for the first and second journals based at least in part on entries of the contention resolution table.

10. The apparatus of claim 9 wherein executing the contention resolution algorithm further comprises:
 performing recovery operations for a particular subset of the entries of the first journal;
 for each of one or more remaining entries of the first journal, determining if that entry of the first journal corresponds to one of the lock contention ranges of the contention resolution table;
 responsive to the entry corresponding to one of the lock contention ranges of the contention resolution table, skipping an unlock operation for a logical address range lock for that entry;
 responsive to the entry not corresponding to any of the lock contention ranges of the contention resolution table, performing an unlock operation for a logical address range lock for that entry; and
 performing recovery operations for entries of the second journal.

11. The apparatus of claim 10 wherein the remaining entries comprise entries of the first journal that do not have corresponding head entries in the first journal.

12. The apparatus of claim 10 wherein executing the contention resolution algorithm further comprises:
 responsive to completion of all recovery operations for entries of the second journal, performing unlock operations for any remaining logical address range locks for the second journal;
 completing any remaining recovery operations for entries of the first journal; and
 clearing the contention resolution table.

13. The apparatus of claim 2 wherein the storage system comprises a plurality of storage nodes each comprising a set of processing modules configured to communicate with corresponding sets of processing modules on other ones of the storage nodes, the sets of processing modules of the storage nodes of the storage system collectively comprising at least a portion of the storage controller of the storage system.

14. The apparatus of claim 13 wherein local copies of the first and second journals are stored on respective ones of the storage nodes and wherein a given such local copy of the first or second journal for one of the storage nodes also represents a remote copy of that journal for one or more other ones of the storage nodes.

15. A method comprising:
 maintaining at least first and second journals for respective first and second different types of input-output requests;
 moving one or more entries between the first journal and the second journal under one or more specified conditions;
 performing a clean-up operation for at least one of the first and second journals in conjunction with the moving of the one or more entries; and
 responsive to a failure occurring during the clean-up operation, executing a contention resolution algorithm to resolve logical address range lock contentions between different entries of the first and second journals;
 wherein the method is implemented by at least one processing device comprising a processor coupled to a memory.

16. The method of claim 15 wherein executing a contention resolution algorithm to resolve logical address range lock contentions between different entries of the first and second journals comprises:
 applying logical address range locks for entries of the first journal;
 making attempts to apply logical address range locks for entries of the second journal; and
 for each of one or more of the attempts that are unsuccessful due to logical address range lock contention with the first journal:

determining a lock contention range for a corresponding entry of the second journal by repeating the attempt one or more times utilizing a reduced locking granularity; and entering the lock contention range in a contention resolution table;

wherein recovery operations are performed for the first and second journals based at least in part on entries of the contention resolution table.

17. The method of claim 16 wherein executing the contention resolution algorithm further comprises:

performing recovery operations for a particular subset of the entries of the first journal;

for each of one or more remaining entries of the first journal, determining if that entry of the first journal corresponds to one of the lock contention ranges of the contention resolution table;

responsive to the entry corresponding to one of the lock contention ranges of the contention resolution table, skipping an unlock operation for a logical address range lock for that entry;

responsive to the entry not corresponding to any of the lock contention ranges of the contention resolution table, performing an unlock operation for a logical address range lock for that entry; and performing recovery operations for entries of the second journal.

18. A computer program product comprising a non-transitory processor-readable storage medium having stored therein program code of one or more software programs, wherein the program code when executed by at least one processing device causes said at least one processing device:

to maintain at least first and second journals for respective first and second different types of input-output requests;

to move one or more entries between the first journal and the second journal under one or more specified conditions;

to perform a clean-up operation for at least one of the first and second journals in conjunction with the moving of the one or more entries; and responsive to a failure occurring during the clean-up operation, to execute a contention resolution algorithm to resolve logical address range lock contentions between different entries of the first and second journals.

19. The computer program product of claim 18 wherein executing a contention resolution algorithm to resolve logical address range lock contentions between different entries of the first and second journals comprises:

applying logical address range locks for entries of the first journal;

making attempts to apply logical address range locks for entries of the second journal; and for each of one or more of the attempts that are unsuccessful due to logical address range lock contention with the first journal:

determining a lock contention range for a corresponding entry of the second journal by repeating the attempt one or more times utilizing a reduced locking granularity; and entering the lock contention range in a contention resolution table;

wherein recovery operations are performed for the first and second journals based at least in part on entries of the contention resolution table.

20. The computer program product of claim 19 wherein executing the contention resolution algorithm further comprises:

performing recovery operations for a particular subset of the entries of the first journal;

for each of one or more remaining entries of the first journal, determining if that entry of the first journal corresponds to one of the lock contention ranges of the contention resolution table;

responsive to the entry corresponding to one of the lock contention ranges of the contention resolution table, skipping an unlock operation for a logical address range lock for that entry;

responsive to the entry not corresponding to any of the lock contention ranges of the contention resolution table, performing an unlock operation for a logical address range lock for that entry; and performing recovery operations for entries of the second journal.

* * * * *